(12) United States Patent
Tiesler

(10) Patent No.: US 7,291,082 B2
(45) Date of Patent: Nov. 6, 2007

(54) AUTOMATIC GEARBOX

(75) Inventor: Peter Tiesler, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 260 days.

(21) Appl. No.: 10/523,601

(22) PCT Filed: Aug. 7, 2003

(86) PCT No.: PCT/EP03/08733

§ 371 (c)(1), (2), (4) Date: Feb. 4, 2005

(87) PCT Pub. No.: WO2004/020873

PCT Pub. Date: Mar. 11, 2004

(65) Prior Publication Data

US 2006/0040780 A1    Feb. 23, 2006

(30) Foreign Application Priority Data

Aug. 9, 2002   (DE) .............................. 102 36 607

(51) Int. Cl.
*F16H 37/08* (2006.01)
(52) U.S. Cl. ....................... 475/198; 475/213
(58) Field of Classification Search ............... 475/210, 475/212, 213, 211, 198, 204
See application file for complete search history.

(56) References Cited

U.S. PATENT DOCUMENTS

| 3,446,095 | A |   | 5/1969  | Bookout    |         |
|-----------|---|---|---------|------------|---------|
| 3,491,621 | A |   | 1/1970  | Moan       |         |
| 3,618,713 | A | * | 11/1971 | Batchelor  | 184/15.1|
| 4,938,097 | A |   | 7/1990  | Pierce     |         |
| 5,024,638 | A |   | 6/1991  | Sakakibara et al. |  |
| 5,081,886 | A | * | 1/1992  | Person et al. | 477/131 |
| 5,215,161 | A | * | 6/1993  | Kobayashi  | 180/248 |
| 5,261,862 | A |   | 11/1993 | Pierce     |         |

(Continued)

FOREIGN PATENT DOCUMENTS

DE    38 43 989 A1    7/1989

(Continued)

*Primary Examiner*—Roger Pang
*Assistant Examiner*—Justin K. Holmes
(74) *Attorney, Agent, or Firm*—Davis Bujold & Daniels, P.L.L.C.

(57) ABSTRACT

The invention relates to an automatic gearbox, especially for a motor vehicle, comprising a drive shaft (7), a driven shaft which is non-coaxially arranged on the drive shaft (7), a planetary gearbox which is non coaxial in relation to the drive shaft (7), a planetary gear which is coaxial in relation to the drive shaft (7) and which comprises at least one set of planet wheels (14) and at least one switch element (10) for the selective transmission of the speed of a driving motor of the drive shaft (7) on an output element of the planet gear. The automatic gearbox also comprises a chain drive (18) with constant transmission, whose drive wheel (19) is connected to the output element of the planetary gear and is coaxially arranged on the drive shaft (7), and whose driven wheel (22) is actively connected to the driven shaft by means of a constant transmission. The chain drive (18) is adjacent to the housing wall (2) of the automatic gearbox directly in the axial direction thereof. The drive wheel (19) of the chain drive (18) at least partially engages with a switch element (10) in an axial manner on the side thereof which faces away from the gearbox housing wall (2).

21 Claims, 3 Drawing Sheets

U.S. PATENT DOCUMENTS

| | | |
|---|---|---|
| 5,743,824 A | 4/1998 | Park |
| 5,833,566 A * | 11/1998 | Showalter .................... 475/198 |
| 5,954,612 A * | 9/1999 | Baxter, Jr. ................... 475/198 |
| 6,283,887 B1 * | 9/2001 | Brown et al. ................ 475/204 |
| 6,579,204 B2 * | 6/2003 | Brown et al. ................ 475/204 |
| 6,729,990 B1 | 5/2004 | Haupt |
| 7,189,179 B2 * | 3/2007 | Williams et al. ............ 475/204 |
| 2003/0224894 A1 * | 12/2003 | Vonnegut et al. ........... 475/204 |

FOREIGN PATENT DOCUMENTS

| | | |
|---|---|---|
| DE | 199 32 613 A1 | 1/2001 |
| EP | 0 202 079 A1 | 11/1986 |
| JP | 62063262 A | 3/1987 |

* cited by examiner

AUTOMATIC GEARBOX

The invention relates to an automatic transmission, particularly for a motor vehicle, comprising one drive shaft, one driven shaft non-coaxial to the drive shaft, one planetary gear co-axial to the drive shaft and having at least one planetary gear set and at least one switch element for selective transmission of an input rotational speed of the drive shaft to an output element of the planetary gear, the same as one chain drive of constant ratio abutting in axial direction directly on a housing wall of the automatic transmission and whose drive wheel is connected with the output element of the planetary gear and disposed co-axially relative to the drive shaft and whose driven wheel is operatively connected via a constant ratio with the driven shaft.

U.S. Pat. No. 4,938,097 has disclosed a generic automatic transmission. This 4-gear automatic transmission for a motor vehicle is constructed in transaxle design and comprises one torque converter as starting element and one planetary gear co-axially disposed in relation to the torque converter. One turbine shaft of the torque converter forms the drive shaft of the planetary gear. The planetary gear has two planetary gear sets, four wet running clutches, two wet running brakes and two free wheels. By selective closing of the switch elements, a transmission input rotational speed can be transmitted to a ring gear of the third planetary gear set as output element of the planetary gear. The second planetary gear set abuts directly on a transmission housing wall upon whose side, remote from the second planetary gear set, the torque converter abuts. The ring gear of the second planetary gear set at the same time is designed as a drive wheel of a chain drive and is supported upon a stator shaft coordinated with the torque converter. One driven wheel of the chain drive is disposed paraxially relative to the second planetary gear set and transmits an output rotational speed of the planetary gear to a sun gear of a rear-mounted driven planetary gear set. The ring gear of the driven planetary gear set is fixed on the transmission housing. One planet carrier of the driven planetary gear set is connected via one differential with a driven shaft of the automatic transmission extending paraxially relative to the drive shaft. Since the chain drive, seen in radial direction, extends paraxially above the second planetary gear set, for a 4-gear automatic transmission, there results a compact design needing small axial installation space in the motor vehicle.

U.S. Pat. No. 5,261,862 discloses a further development as a 5-gear automatic transmission of the 4-gear automatic transmission described in U.S. Pat. No. 4,938,097. This motor vehicle transmission in transaxle design comprises without change one torque converter as starting element and one planetary gear disposed co-axial to the torque converter. Compared to U.S. Pat. No. 4,938,097, the planetary gear has now been increased by a third planetary gear set, two additional wet running brakes and one third free wheel. The third planetary gear set is situated upon the side of the gear remote form the torque converter and works as overdrive ratio. The ring gear of the second planetary gear set forms without change the output element of the planetary gear set and is, at the same time, designed as drive wheel of the chain drive which is operatively connected with the driven shaft of the transmission that extends paraxially to the torque converter. Compared to U.S. Pat. No. 4,938,097, the 5-gear automatic transmission clearly needs more installation space due to the additional overdrive unit disposed co-axially to the drive shaft.

From DE 199 32 613 A has become known one-6-gear automatic transmission where a planetary gear, disposed co-axially to the drive shaft of the automatic transmission, has one-front-mounted planetary gear set working as reducing gear, one multi-section main planetary gear set designed as a Ravigneaux wheel set, three wet running clutches and two wet running brakes. By selective closing of the switch elements, an input rotational speed of the drive shaft can be transmitted to an output element of the planetary gear. The output element of the planetary gear is designed as a ring gear of the main planetary gear set and connected with a first spur wheel of a four-wheel, spur-gear stage. The output-side fourth spur gear of the spur gear stage is connected via one differential with one driven shaft of the automatic transmission that extends paraxially to the drive shaft. Spatially seen, the spur gear stage is situated axially between a prime mover of the automatic transmission and the planetary gear and abuts on one side directly on one clutch and on the other side directly on a transmission housing wall facing the prime mover. As result of the special gear set draft and of substituting for a torque converter as starting element a switch element inside the transmission, the axial installation space needed by this 6-gear automatic transmission is similar to the axial installation space needed by the above described 4-gear automatic transmission.

The problem on which the invention is based is to provide an automatic transmission with non-coaxial drive and driven shafts of the type described above in which the axial installation space required is minimized. This problem is solved by an automatic transmission having the features of the main claim. Advantageous developments and improvements result from the sub-claims.

On the basis of the above described prior art, the inventive automatic transmission comprises one drive shaft, one driven shaft non-coaxial to the drive shaft, one planetary gear disposed co-axially to the drive shaft and one chain drive of constant ratio, the driven wheel of which is connected with one output element of the planetary gear and situated co-axially to the drive shaft and the driven wheel of which is operatively connected via a constant ratio with the driven shaft. The planetary gear has at least one planetary gear set and at least one switch element for selective transmission of an input rotational speed of the drive shaft to the output element of the planetary gear. The planetary gear, therefore, produces a variable ratio of the input rotational speed of the automatic transmission from which is produced the output ratio of the automatic transmission, via the constant ratio between the drive wheel of the chain drive and the output shaft.

Similar to the prior art, the output element of the planetary gear can be designed as a ring gear. But, unlike the prior art stated in the preamble, the ring gear is advantageously connected with the drive wheel of the chain drive via form-locking engaging gears. Hereby results an improved noise uncoupling of the chain drive from the planetary gear.

The chain drive abuts in axial direction directly on a housing wall of the automatic transmission. According to the invention, the drive wheel of the chain drive radially overlaps at least partly in axial direction one switch element axially abutting directly on the side thereof remote from the transmission housing wall.

Therefore, compared to the prior art as stated in the preamble, the chain drive, spatially seen, is situated axially directly between the transmission housing wall and one switch element of the planetary gear. The transmission housing wall faces, for example, one prime mover of the automatic transmission. The special configuration of the drive wheel of the chain drive achieves a specially space-saving agglomeration of the structural elements of the planetary gear situated co-axially to the drive shaft of the automatic transmission and thus an automatic transmission of axially short design. The width of the chain drive is determined by the output torque of the planetary gear which, compared to the clearly greater output torque of the automatic transmission, is foremost primarily produced by the constant ratio situated, seen in power flow direction behind the chain drive. For example, if the spur gear stage of the 6-gear automatic transmission disclosed in DE 199 32 613 A1 is substituted for the inventive chain drive and planetary gear set rear-mounted on the chain drive to produce the constant ratio, the axial length of the automatic transmission can be reduced by about half the width of the helical-cut spur gear disposed co-axially to the drive shaft, especially since the bearing of the drive wheel of the chain drive, compared to the bearing of the spur gear, has to be laid out on only weak axial forces.

The inventive automatic transmission as motor vehicle transmission for a power train with prime mover disposed transverse to the direction of travel is used in preference to an application with draft conditioned small requirement of axial installation space for a transmission flanged behind the engine, when seen in engine length direction.

In an advantageous development of the invention, it is proposed that the drive wheel of the chain drive abuts in axial direction directly on a disc carrier of the switch element, particularly on an external disc carrier designed as clutch cylinder, a servo device of this switch element being situated upon the side of the switch element facing the drive wheel of the chain drive. The drive wheel of the chain drive can radially at least partly overlap in axial direction the discs of said switch element. The switch element can be designed both as clutch and as brake.

In another development of the invention, it is proposed that the drive wheel of the chain drive be supported on a projection of the transmission housing wall extending axially in direction of the chain drive. Alternatively, the drive wheel of the chain drive can also be supported upon a shaft fixedly connected with a transmission housing. Such a shaft fixed to the housing can be, for example, a stator shaft of a hydrodynamic torque converter provided as starting element of the automatic transmission. The support can advantageously be designed as space-saving axial/radial needle bearing since in the layout, with regard to the radial load, to a great extent only the traction forces of the straight-cut chain wheels have to be taken into account and axial supporting forces to a great extent result only from the axial thrust of the output element of the planetary gear, i.e., from an helical-cut toothing of the ring gear. The system is at least extensively free from tipping forces generating, for example, by an helical-cut toothing. The omission of a usually prestressed taper roller bearing unit acts positively not only upon the axial installation space need, but also upon the efficiency of the automatic transmission.

By centering a drive wheel and a driven wheel of the power drive in a common transmission housing element designed as a transmission housing wall or a converter bell, an alignment error of the chain drive can be minimized.

For lubricating the chain drive, a separate spray pipe can be provided through which the lubricant is sprayed from inside to the inner diameter of the chain. Instead of the sprayer pipe at least one adequately dimensioned hole or aperture can also be integrated directly in the stator shaft or in the housing projection upon which the drive wheel of the chain drive is supported and the lubricant can be fed from there to the inner side of the chain.

In one development of the invention, especially in relation to an arrangement of the chain drive close to the engine, an oil pump for lubricant supply of the automatic transmission is integrated directly in the transmission housing wall (close to the engine) on which the drive wheel of the chain drive is supported. Alternative to this, the oil pump can also be supported in the shaft, especially the stator shaft, on which the drive wheel of the chain drive is supported. Hereby a very compact, space-saving construction of the automatic transmission results in the area of the pump.

Similarly to the prior art, the driven wheel of the chain drive can be connected with an input element of a driven planetary gear set which, together with the constant ratio of the chain drive, produces the output rotational speed of the driven shaft from the output rotational speed of the planetary gear. One sun gear preferably forms the input element and one web, an output element of the driven planetary gear set, one ring gear being designed fixed to the transmission housing. Specially in an automatic transmission of a motor vehicle with engine-gear unit disposed across the travel direction, a conventional differential can be provided between the output element of the driven planetary gear set and the driven shaft of the automatic transmission, when seen in power flow direction.

The invention is explained in detail with reference to the Figures that follow in which are illustratively shown designed constructions. In all Figures similar construction elements have been provided with the same reference numerals. The Figures show:

Figure 1:
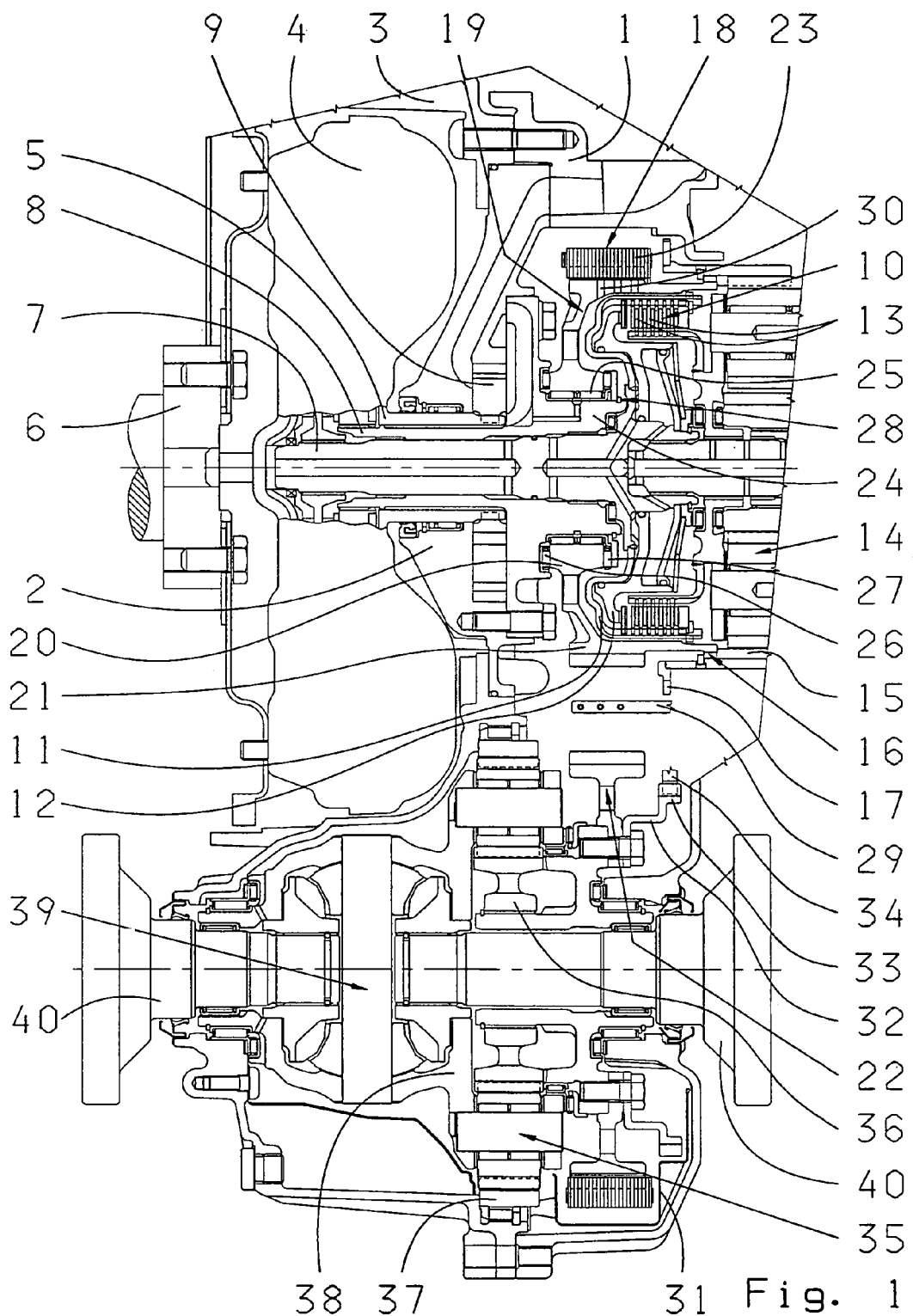
FIG. 1 is an abstracted transmission section of a first design with an inventive chain drive.

The first illustrative design with an inventive chain drive according to FIG. 1 concerns an automatic transmission for a motor vehicle having engine-gear unit mounted transverse to travel direction. One transmission housing 1 has, on one side which faces a prime mover (not shown in detail), one housing wall 2. In the illustration shown, the transmission housing wall 2 forms, at the same time, a housing for an oil pump 9. One torque converter 4 is situated as starting element of the automatic transmission upon the side of the transmission housing wall 2 facing the prime mover. One converter bell 3 encloses the torque converter 4 and is screwed with the transmission housing 1. The transmission housing wall 2 is screwed with the converter bell 3. In another design, the transmission housing wall 2 can also be directly screwed with the transmission housing 1 or also be designed integrally with transmission housing 1. One converter neck 5 of the torque converter 4 is supported in the transmission housing wall 2. The torque converter 4 is driven by an engine shaft 6 of the prime mover and drives a drive shaft 7 of the automatic transmission. One stator shaft 8 supports the torque converter 4 against the transmission housing 1. For this purpose, the stator shaft 8 is screwed with the transmission housing wall 2 axially penetrating the transmission housing 2. The drive shaft 7 passes concentrically within the stator shaft 8 which, in turn, passes concentrically within the converter neck 5. The converter neck 5 drives the oil pump 9 via adequately designed slaving for supplying lubricant and pressure medium to the automatic transmission. In the illustration shown, the oil pump 9 is integrated in the transmission housing wall 2 and sealed from the interior of the transmission housing 1 by one flange of the stator shaft 8.

Upon the side of the transmission housing wall 2 remote from the prime mover or the torque converter 4, co-axially to the drive shaft 7, one planetary gear having at last one switch element 10 and at least one planetary gear set 14 extends within the transmission housing 1. By selective closing of the switch elements (not separately shown in detail), an input rotational speed of the drive shaft 7 can be transmitted, preferably in several gear steps, to an output element of the planetary gear. In the illustration shown, this output element of the planetary gear is a ring gear 15 of the planetary gear set 14. The switch element 10 is situated upon the side of the planetary gear set 14 facing the transmission housing wall 2.

Upon the side of the transmission housing wall 2, remote from the prime mover or the torque converter 4, and directly abutting on it a chain drive 18 is situated by which an output rotational speed of the planetary gear is transmitted to an output unit of the automatic transmission. The output unit essentially comprises one output planetary gear set 34, one differential 39 and one driven shaft of the automatic transmission, designed as two output flanges 40. The ratio of the chain drive 18 and output assembly is respectively constant.

One drive wheel 19 of the chain drive 18 has one discoid section 20 immediately adjacent to the transmission housing wall 2 which, in the illustration shown, is supported on a bearing section 24 of the stator wheel 8, i.e., indirectly on the transmission housing wall 2. For this purpose, the bearing section 24, of the stator shaft 8, extends axially into the interior of the transmission housing 1 in direction of the switch element 10 or planetary gear set 14, i.e., in direction opposite to the prime mover. In the illustration shown, the bearing of the drive wheel 19 of the chain drive comprises one radial bearing 25, one axial bearing 26 on the side of the housing wall and one axial bearing 27 on the side of the switch element. The radial bearing 25 and the axial bearing 27 on the side of the switch element are axially fixed by a guard ring 28 upon the bearing section 24 of the stator shaft 8. This simple axial securing of the bearing unit is possible since altogether there act only slight axial forces from the axial thrust of the ring gear 15 which, as will be further explained in detail herebelow, is connected with the drive wheel 19 and the stator shaft 8 is fixed to the housing. For lubricating the radial bearing 25, the bearing section 24 of the stator shaft 8 has in simple manner a radial lubrication hole through which the lubricant is conveyed from the inside substantially to the center of the radial bearing 25. In another design of the bearing unit, the axial bearing 27 on the side of the switch element can also be fixed axially on the bearing section 24 of the stator shaft 8, for example, a combined axial/radial bearing can also be provided. Compared to a taper roller bearing of an helical-cut spur gear, the axial space required by the described bearing of the drive wheel 19 of the chain drive is advantageously considerably reduced, since the chain drive 18, unlike the helical-cut spur drive, at least to a great extent, is free from tipping torques and the axial bearings 26, 27 can be designed as needle bearings of adequately small dimensions. Besides, the efficiency of the needle bearing is more compared to a prestressed taper roller bearing.

In one other development, the drive wheel 19 of the chain drive 18 can also be supported upon a projection of the transmission housing wall 2 which extends axially into the interior of the transmission housing 1.

In one development of the bearing of the drive wheel 19 of the chain drive, it is proposed to fix only the radial bearing 25 axially directly upon the bearing section 24 of the stator shaft 8 by the guard ring 28, whereas the drive wheel 19 of the chain drive 18 is fixed axially toward the transmission housing 1 by component parts of the transmission that abut on the drive wheel 19. Thereby the drive wheel 19 is "floatingly" supported axially between the transmission housing wall 2 (on the side of the torque converter) and the transmission housing 1 (remote from the torque converter). In this case, the axial bearing 27 on the switch element side abuts, for example, directly on a flange-shaped section of the drive shaft 7 or directly on an external disc carrier 11 of the switch element 10. By such bearing arrangement, an axial bearing can be advantageously spared thus further reducing the axial length of the automatic transmission.

Radial and axial bearings 25, 26, 27 obviously can be designed both as needle bearings and as roller or ball bearings.

On its side, remote from the transmission housing wall 2, the drive wheel 19 of the chain drive 18 abuts in axial direction directly on the switch element 10 which, in the illustration shown, is designed as a clutch. To implement a design that is as length sparing as possible, the drive wheel 19 of the chain drive 18 is designed cylinder shaped, a cylindrical section 21 of the drive wheel 19 attaching to the outer diameter of the discoid section 20 of the drive wheel 19 and extending axially in the interior of the transmission housing 1 in direction of the planetary gear set 14. The cylindrical section 21 of the drive wheel 19 and the chain drive radially overlaps the switch element 10 here in axial direction. Seen in axial direction, a chain 23 of the chain drive 18 passes radially partly above the radial bearing of the drive wheel 19 of the drive chain on the bearing section 24 of the stator shaft 8 and seen in axial direction radially partly above the switch element 10. In the illustration shown, the switch element 10 is entirely situated within a cylinder-shaped section 21 of the drive wheel 19 of the chain drive, the disc carrier 11 of the switch element 10, illustratively designed as a clutch cylinder, abutting directly on the drive wheel 19 of the chain drive and a servo device 12 of the switch element 10 for actuating the discs 13 thereof being situated on the side of the switch element 10 facing the transmission housing wall 2. On the side of the cylinder-shaped section 21, remote from the transmission housing wall 2, the drive wheel 19 of the chain drive is connected in form-locking manner via engaging gears 16 with the ring gear 15 of the planet carrier 14. Said engaging gears 16 can be optimized with regard to good resonant uncoupling of chain drive 18 and planetary gear set 14 by already known measures. One rotational speed sensor 17 for determining the output rotational speed of the planetary gear or the output rotational speed of the automatic gear which, in the illustration shown, is firmly connected with the ring gear 15, in another development, can be also fixedly connected with the drive wheel 19 of the chain drive or integrated therein.

One drive wheel 22 of the chain drive 18 is connected with a sun gear 36 of the output planetary gear set 35 and radially supported in the transmission housing 1. The driven wheel 22 of the chain drive is, in the illustration, axially supported combined with the axial bearing of the differential 39 which is rear-mounted in power flow direction on the driven wheel 22 of the chain drive. Due to the extensive freedom of transverse force of the chain drive 18, space-saving needle bearings are provided. Other known support drafts can alternatively be used here also, for example, with combined axial/radial bearings. In the illustration shown, the sun gear 36 and the driven wheel 22 are designed in multiple pieces and screwed with a parking interlock gear 32 designed as a separate construction element. The parking interlock gear 32 has a parking interlock gearing 33 in which can engage a parking interlock pawl 34 for locking the driven shaft of the automatic transmission. In another development, the sun gear 36 and the driven wheel 22, driven wheel 22 and parking interlock gear 32, or also all three elements sun gear 36, driven wheel 22 and parking interlock gear 32 can be integrally designed. One ring gear 37 is fixed to the transmission housing wall 2. One web 38 of the output planetary gear set 35 forms the output element thereof and is connected with the differential 39 which, in turn, is connected with the two output flanges 40.

In the illustration shown, to lubricate the chain 23, one spray pipe 29 is provided which axially immerses in the path of the chain 23 stressed between the drive wheel 19 and the driven wheel 22 of the chain drive, lubricant being sprayed on the inner diameter of the chain 23 through several holes of the spray pipe 29. To further improve the chain lubrication, in the cylindrical section 21 of the drive wheel 19 of the drive chain, in the area of the chain gearing, several radial lubrication holes 30 are provided through which the lubricating oil is conveyed directly to the tooth contact. To prevent excessive oil frothing due to the chain 23 immersing in the oil sump of the automatic transmission, one screening plate 31 is provided.

In one development of the chain lubrication it is proposed to increase the effectiveness of the lubricant oil supply through the radial lubrication holes 30; there be also provided on the inner diameter of the cylindrical section 21 of the drive wheel 19 of the chain drive (at least), one annular groove in which the radial lubrication holes 30 discharge. Instead of or also in addition to the annular groove on the inner diameter of the cylindrical section 21 of the drive wheel 19 of the chain drive, an additional oil seal can also be provided on the outer diameter of the disc carrier 11, which retains the lubrication oil in a manner such that an increased volume current of lubricant is achieved through the radial lubrication holes 30. In one other development of the chain lubrication, it can be provided that the stator shaft 8 has at least one special lubrication hole by way of which the lubricant is sprayed on the inner side of the chain 23.

Figure 2:
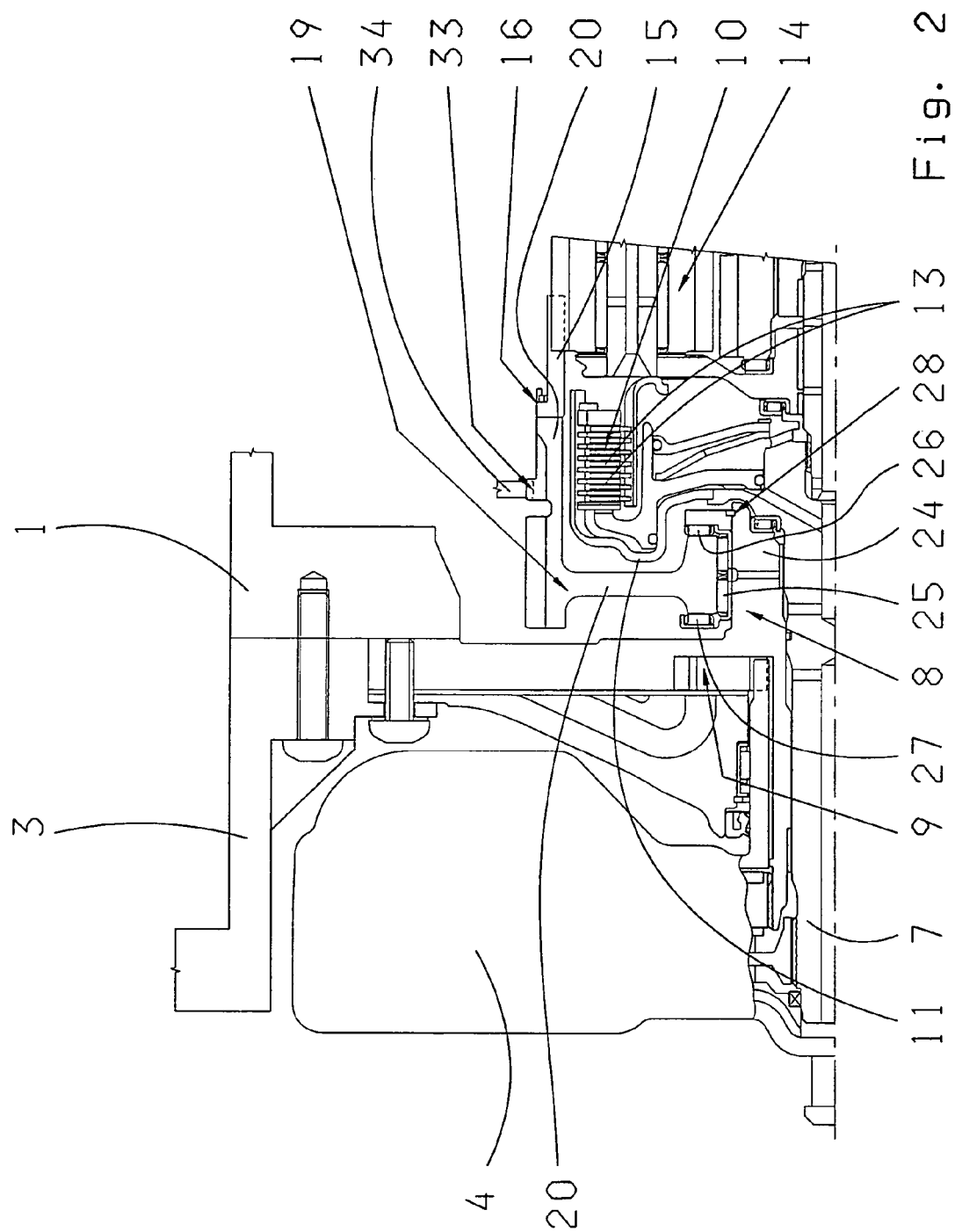
FIG. 2 is an abstracted transmission section of second design with an inventive drive wheel of a chain drive.

Referring to FIG. 2, a second illustrative design is now explained with inventive drive wheel of the chain drive. Differing from the first design of FIG. 1, described above in detail, the stator shaft 8 now forms the transmission housing wall on the converter or engine side and has one accordingly designed discoid section which is screwed with the transmission housing 1 via the converter bell 3. The stator shaft 8 obviously can also be screwed directly with the transmission housing 1. In a space-saving manner, the oil pump 9 is integrated directly in the stator shaft 8 on the side of the stator shaft 8 facing the torque converter 4.

Compared to FIG. 1, the drive wheel 19 of the chain drive is located unchanged in the interior of the transmission housing 1 and abuts in axial direction directly on the discoid section of the stator shaft 8. Also compared to FIG. 1, the cylindrical bearing section 24 of the stator shaft 8 axially extends unchanged in the interior of the transmission housing 1 in direction of the switch element 10 or the planetary gear set 14. As can be seen in FIG. 2, the bearing of the drive wheel 19 of the chain drive comprises the radial bearing 26 on the bearing section 24 of the stator shaft 8, the axial bearing 26 on the side of the housing wall and the axial bearing 27 on the side of the switch element, the whole bearing combination of the three bearings 25, 26, 27, together with the drive wheel 19 of the chain drive, being axially fixed via the guard ring 28 upon the bearing section 24 of the stator shaft 8.

The drive wheel 19 of the chain drive is, in turn, designed as open cylinder in direction toward the switch element 10 or the planetary gear set 14 with discoid section 20 of the drive wheel 19 of the chain drive and cylindrical section 21. The discoid section 20 abuts directly on the discoid section of the stator shaft 8. The cylindrical section 21 of the drive wheel 19 of the drive chain overlaps the switch element 10 and from its side remote from the converter or engine is connected in form-locking manner via the gearing 16 with the ring gear 15 of the planetary gear set 14. The ring gear 15, in turn, forms illustratively the output element of the planetary gear situated co-axially to the drive shaft 7. Axially seen the chain (not shown in detail) of the chain drive passes radially above the discoid section 20 of the drive wheel 19 of the chain drive and seen in axial direction radially passes at least predominantly above the radial bearing 25.

The switch element 10 is designed as a clutch with a disc carrier 11 illustratively designed as clutch cylinder for accommodating external discs and connected with the drive shaft 7. The disc carrier here abuts directly on the drive wheel 19 of the chain drive. In another development, the disc carrier can obviously be designed also as an internal disc carrier.

According to FIG. 2, differing from FIG. 1, the parking interlock gearing 33, which the parking interlock pawl 34 can radially engage for blocking the driven shaft of the automatic transmission, is integrated in the drive wheel 19 of the chain drive. Spatially seen, the parking interlock gearing 33 is located in the cylindrical section 21 of the drive wheel 19, axially seen adjacent to the chain toothing thereof, radially seen above the discs 13 of the switch element 10. Therefore, a separate parking interlock wheel is no longer needed.

Figure 3:
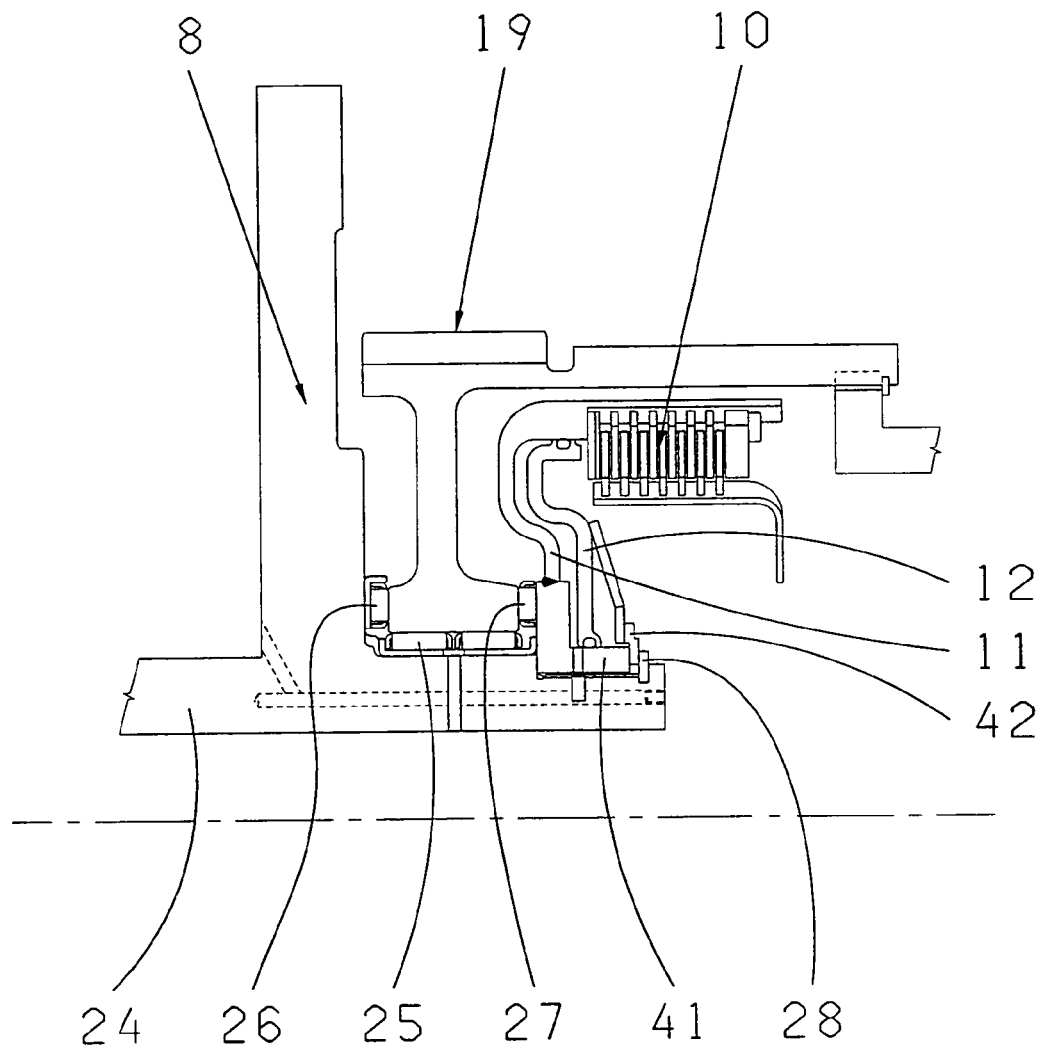
FIG. 3 is a sectional graph of a third design with an inventive drive wheel of a chain drive.

A third illustrative design with an inventive drive wheel of the chain drive is now explained with reference to FIG. 3, the switch element 10 axially abutting on the drive wheel 19 of the chain drive being now designed as a brake. With 8 is designated unchanged the stator shaft upon the bearing section 24 of which is supported the drive wheel 19 of the drive chain. The disc carrier 11 illustratively designed as a cylindrical external disc carrier, is firmly connected with a hub 41. Said hub 41 is connected with positive fit with the stator shaft 8 via a suitably designed spline section, being thus fixed to the housing. The hub is axially secured to the stator shaft 8 via a thrust washer 42 and the guard ring 28, said guard ring 28 engaging in a corresponding groove of the stator shaft 8. The thrust washer 42 additionally assumes the function of axial support of a reset element, designed as plate spring in the illustration shown, of the servo device 12 of the brake 10. The pressure medium is supplied to the servo device 12 via adequately designed holes and ducts of the stator shaft 8.

For support of the drive wheel 19 of the chain drive, as in FIG. 1, one radial bearing 25 designed as needle bearing and two axial bearings 26, 27 designed as needle bearings are provided. The axial bearing 27 on the switch element side is now supported via the hub 41, the thrust washer 42 and the guard ring 28, whereby the drive wheel 19 of the chain drive is axially fixed with its bearing system against the stator shaft 8.

REFERENCE NUMERALS 1 transmission housing
2 transmission housing wall
3 converter ball 4 torque converter
5 converter neck
6 engine shaft
7 drive shaft of the automatic transmission
8 stator shaft
9 oil pump
10 switch element
11 disc carrier
12 servo device of the switch element
13 discs of the switch element
14 planetary gear set
15 ring gear of the planetary gear set
16 spline section
17 rotational speed sensor disc
18 chain drive
19 drive wheel of the chain drive
20 discoid section of the drive wheel
21 cylinder-shaped section of the drive wheel
22 driven wheel of the chain drive
23 chain of the chain drive
24 bearing section of the stator shaft
25 radial bearing of the drive wheel
26 axial bearing of the drive wheel of the chain drive on housing wall side
27 axial bearing of the drive wheel of the chain drive on switch element side
28 guard ring
29 spray pipe of the chain drive
30 lubrication holes of the drive wheel of the chain drive
31 screening plate
32 parking interlock gear
33 parking interlock gearing
34 parking interlock pawl
35 driven planetary gear set
36 sun gear of the driven planetary gear set
37 ring gear of the driven planetary gear set
38 web of the driven planetary gear set
39 differential
40 output flange
41 hub
42 thrust washer

The invention claimed is:

1. An automatic transmission for a motor vehicle comprising:
   one drive shaft (7),
   one driven shaft on an axis different than the drive shaft (7),
   one planetary gear co-axial to the drive shaft (7) and having at least one planetary gear set (14) and at least one switch element (10) for selective transmission of an input rotational speed of the drive shaft (7) to an output element of the planetary gear; and
   one chain drive (18) of constant ratio abutting in an axial direction directly on a transmission housing wall (2) and whose drive wheel (19) is connected with the output element of the planetary gear and situated co-axially to the drive shaft (7) and whose driven wheel (22) is operatively connected with a driven shaft via a constant ratio;
   the drive wheel (19) of the chain drive (18) radially overlaps at least partly, in the axial direction, the switch element (10) axially directly abutting on a side thereof remote from the transmission housing wall (2); and
   the drive wheel (19) of the chain drive (18) radially overlaps, at least partly in the axial direction, at least one of a plurality of discs (13) of the switch element (10) that abut on the drive wheel (19) of the chain drive (18).

2. The automatic transmission according to claim 1, wherein the drive wheel (19) of the chain drive (18) abuts, in the axial direction, directly on a single disc carrier (11) of the switch element (10).

3. The automatic transmission according to claim 1, wherein one servo device (12) of the switch element (10) abutting on the drive wheel (19) of the chain drive (18) is situated upon a side of the switch element (10) facing the drive wheel (19) of the chain drive (18).

4. The automatic transmission according to claim 1, wherein the switch element (10) abutting on the drive wheel (19) of the drive chain (18) is a clutch.

5. The automatic transmission according to claim 1, wherein the switch element (10) abutting on the drive wheel (19) of the drive chain (18) is a brake.

6. The automatic transmission according to claim 1, wherein the drive wheel (19) and the driven wheel (22) of the chain drive (18) are centered on a same housing element.

7. The automatic transmission according to claim 1, wherein the transmission housing wall (2) abutting on the chain drive (18) faces a prime mover of the automatic transmission.

8. The automatic transmission according to claim 1, wherein for lubrication of the chain drive, a spray pipe is provided by which a lubricant is sprayed upon an inner side of a chain of the chain drive.

9. The automatic transmission according to claim 1, wherein for lubrication of the chain drive (18), in one of a shaft upon which a drive wheel (19) of the chain drive (18) is supported or in a housing projection upon which the drive wheel (19) of the chain drive (18) is supported, at least one hole is integrated directly through which lubricant is supplied to a chain (23) of the chain drive (18).

10. The automatic transmission according to claim 1, wherein the drive wheel (19) of the chain drive (18) additionally has a parking interlock gear (33) in which can engage a parking interlock pawl (34) of the automatic transmission for locking the driven wheel of the automatic transmission.

11. The automatic transmission according claim 1, wherein the driven wheel (22) of the chain drive is connected with a parking interlock gear (32), and the parking interlock gear (32) has a parking interlock toothing (33) in which one parking interlock pawl (34) of the automatic transmission can engage for locking the driven shaft of the automatic transmission.

12. The automatic transmission according to claim 1, wherein the driven wheel (22) of the chain drive additionally has a parking lock toothing (33) in which a parking interlock pawl (34) of the automatic transmission can engage for locking the driven shaft of the automatic transmission.

13. The automatic transmission according to claim 1, wherein the drive wheel (19) of the chain drive (18) is supported upon one projection of the transmission housing wall (2) extending in the axial direction of the chain drive (18).

14. The automatic transmission according to claim 13, wherein a bearing of the drive wheel (19) of the chain drive (18) is one of a needle bearing or a roller bearing, the bearing of the drive wheel (19) comprises a radial bearing (25), an axial bearing (26) on a side of the transmission housing wall and an axial bearing (27) on a side of the switch element.

15. The automatic transmission according to claim 1, wherein the drive wheel (19) of the drive chain (18) is supported on one shaft fixedly connected with a transmission housing (1).

16. The automatic transmission according to claim 15, wherein a shaft upon which the drive wheel (19) of the chain drive (18) is supported is a stator shaft (8) of a hydrodynamic torque converter (4).

17. The automatic transmission according to claim 15, wherein an oil pump (9) of the automatic transmission is integrated in a stator shaft (8).

18. An automatic transmission for a motor vehicle comprising:

a drive shaft (7);

a driven shaft on an axis different than the drive shaft (7);

a planetary gear co-axial to the drive shaft (7) and having at least one planetary gear set (14) and at least one switch element (10) for selective transmission of an input rotational speed of the drive shaft (7) to an output element of the planetary gear; and a chain drive (18) of constant ratio abutting, in an axial direction, directly on a transmission housing wall (2) and whose drive wheel (19) is connected with the output element of the planetary gear and situated co-axially to the drive shaft (7) and whose driven wheel (22) is operatively connected with a driven shaft via a constant ratio;

wherein the drive wheel (19) of the chain drive (18) radially at least partially overlaps, in the axial direction, the switch element (10) axially directly abutting on a side thereof remote from the transmission housing wall (2);

the drive wheel (19) of the chain drive (18) is supported upon one projection of the transmission housing wall (2) extending in the axial direction of the chain drive (18); and a bearing of the drive wheel (19) of the chain drive (18) is axially fixed, by a guard ring (28), on a projection of the transmission housing wall (2) extending one of axially in the direction of the chain drive (18) or on a shaft fixedly connected with the transmission housing (1).

19. The automatic transmission according to claim 18, wherein a radial bearing (25) is axially fixed, by a guard ring (28), on the projection of the transmission housing wall (2) which extends in one of the axial direction of the chain drive (18) or upon the shaft fixedly connected with the transmission housing (1), the drive wheel (19) of the chain drive (18) is axially supported in a direction opposite to the transmission wall (2) on one of a structural element adjacent to the transmission housing (1), a flange-shaped section of the drive shaft (7) or on a disc carrier (11) of the switch element (10) abutting on the drive wheel (19) of the chain drive (18).

20. An automatic transmission for a motor vehicle comprising:

a drive shaft (7);

a driven shaft on an axis different than the drive shaft (7);

a planetary gear co-axial to the drive shaft (7) and having at least one planetary gear set (14) and at least one switch element (10) for selective transmission of an input rotational speed of the drive shaft (7) to an output element of the planetary gear; and a chain drive (18) of constant ratio abutting, in an axial directions, directly on a transmission housing wall (2) and whose drive wheel (19) is connected with the output element of the planetary gear and situated co-axially to the drive shaft (7) and whose driven wheel (22) is operatively connected with a driven shaft via a constant ratio;

wherein the drive wheel (19) of the chain drive (18) radially at least partially overlaps, in the axial direction, the switch element (10) axially directly abutting on a side thereof remote from the transmission housing wall (2); and a ring gear (15) of the planetary gear set (14) forms the output element of the planetary gear set (14).

21. The automatic transmission according to claim 20, wherein the driven wheel (22) of the chain drive is connected with one sun gear (36) of one output planetary gear set (35), a ring gear (37) of the output planetary gear set (35) is connected with a housing (1) of the automatic transmission and the driven shaft of the automatic transmission is operatively connected with a web (38) of the output planetary gear set (35).

* * * * *